(12) United States Patent
Gihm et al.

(10) Patent No.: US 11,798,773 B2
(45) Date of Patent: Oct. 24, 2023

(54) EMITTER WITH EXCELLENT STRUCTURAL STABILITY AND ENHANCED EFFICIENCY OF ELECTRON EMISSION AND X-RAY TUBE COMPRISING THE SAME

(71) Applicant: AweXome Ray, Inc., Anyang-si (KR)

(72) Inventors: Se Hoon Gihm, Seongnam-Si (KR); Keun Soo Jeong, Seoul (KR)

(73) Assignee: AweXome Ray, Inc., Anyang-si (KR)

( * ) Notice: Subject to any disclaimer, the term of this patent is extended or adjusted under 35 U.S.C. 154(b) by 0 days.

(21) Appl. No.: 17/889,787

(22) Filed: Aug. 17, 2022

(65) Prior Publication Data
US 2022/0392730 A1     Dec. 8, 2022

Related U.S. Application Data

(62) Division of application No. 16/666,844, filed on Oct. 29, 2019, now Pat. No. 11,600,462.

(30) Foreign Application Priority Data

Jan. 24, 2019 (KR) .......................... 10-2019-0009430

(51) Int. Cl.
| | |
|---|---|
| *H01J 1/304* | (2006.01) |
| *H01J 9/02* | (2006.01) |
| *H01J 35/06* | (2006.01) |
| *B82Y 10/00* | (2011.01) |

(52) U.S. Cl.
CPC ............ *H01J 35/064* (2019.05); *H01J 1/304* (2013.01); *H01J 9/02* (2013.01); *B82Y 10/00* (2013.01); *H01J 2201/30469* (2013.01); *H01J 2201/3425* (2013.01)

(58) Field of Classification Search
None
See application file for complete search history.

(56) References Cited

U.S. PATENT DOCUMENTS

| | | | |
|---|---|---|---|
| 7,550,907 B2 | 6/2009 | Jiang et al. | |
| 8,368,295 B2 | 2/2013 | Wei et al. | |
| 2003/0002627 A1 | 1/2003 | Espinosa et al. | |
| 2007/0003472 A1 | 1/2007 | Tolt | |
| 2007/0145878 A1* | 6/2007 | Liu ........................ | H01J 63/06 313/318.02 |
| 2009/0208742 A1 | 8/2009 | Zhu et al. | |
| 2010/0181896 A1 | 7/2010 | Lee et al. | |

(Continued)

FOREIGN PATENT DOCUMENTS

| | | |
|---|---|---|
| CN | 102244279 A | 11/2011 |
| CN | 102498539 A | 6/2012 |

(Continued)

OTHER PUBLICATIONS

Office Action in co-pending Japanese Patent Application No. 2021-542451 dated Aug. 29, 2022 (12 pages).

(Continued)

*Primary Examiner* — Ashok Patel
(74) *Attorney, Agent, or Firm* — Young Basile Hanlon & MacFarlane, P.C.

(57) ABSTRACT

The present invention provides an emitter, which comprises carbon nanotubes and is excellent in the efficiency of electron emission, and an X-ray tube comprising the same.

18 Claims, 10 Drawing Sheets

(56) References Cited

U.S. PATENT DOCUMENTS

| | | |
|---|---|---|
| 2010/0260931 A1 | 10/2010 | Malecki et al. |
| 2011/0038465 A1 | 2/2011 | Mahapatra |
| 2011/0116603 A1 | 5/2011 | Kim et al. |
| 2012/0194058 A1 | 8/2012 | Wei et al. |
| 2013/0181570 A1* | 7/2013 | Iizuka ............... H02K 3/02 977/932 |
| 2014/0185777 A1 | 7/2014 | Liu et al. |
| 2017/0011880 A1 | 1/2017 | Hu |
| 2017/0200580 A1 | 7/2017 | Miller et al. |
| 2017/0292208 A1 | 10/2017 | Yoon et al. |
| 2020/0109492 A1 | 4/2020 | Gihm et al. |
| 2020/0243295 A1* | 7/2020 | Gihm ............... H01J 35/064 |

FOREIGN PATENT DOCUMENTS

| | | |
|---|---|---|
| CN | 103354200 A | 10/2013 |
| CN | 103854935 A | 6/2014 |
| CN | 103854958 A | 6/2014 |
| EP | 3315644 A1 | 5/2018 |
| JP | H05347142 A | 1/1995 |
| JP | 2002293629 A | 10/2002 |
| JP | 2007128892 A | 5/2007 |
| JP | 2009117367 A | 5/2009 |
| JP | 4575349 B2 | 11/2010 |
| JP | 2011148689 A | 8/2011 |
| JP | 2012010583 A | 1/2012 |
| JP | 2012134119 A | 7/2012 |
| JP | 2014075336 A | 4/2014 |
| JP | 2015149299 A | 8/2015 |
| JP | 2016046145 A | 4/2016 |
| JP | 2017137232 A | 8/2017 |
| KR | 20070041024 A | 4/2007 |
| KR | 20120090383 | 10/2010 |
| KR | 101284226 B1 | 7/2013 |
| KR | 101387700 B1 | 4/2014 |
| KR | 1020140147004 | 12/2014 |
| KR | 20160102743 A | 8/2016 |
| KR | 20160118637 A | 10/2016 |
| KR | 101718784 | 3/2017 |
| KR | 1020170041365 | 4/2017 |
| KR | 20170121266 | 11/2017 |
| KR | 1020180044114 | 5/2018 |
| KR | 101876076 B1 | 7/2018 |
| KR | 20180104642 A | 9/2018 |
| KR | 101962215 B1 | 3/2019 |
| KR | 101956153 B1 | 6/2019 |
| KR | 101992745 B1 | 6/2019 |
| TW | I386366 B | 2/2013 |
| TW | I386965 B | 2/2013 |
| TW | I478196 B | 3/2015 |
| TW | 201726988 A | 8/2017 |
| WO | 2012074319 A1 | 6/2012 |
| WO | 2016129273 A1 | 8/2016 |
| WO | 2020111520 A1 | 6/2020 |

OTHER PUBLICATIONS

Manishkumar D. Yadav et al., "High Performance Fibers from Carbon Nanotubes: Synthesis, Characterization, and Applications in Compsities—A Review," Industrial & Engineering Chemistry Research, vol. 56, No. 44, pp. 12407-12437.
Extended Eurpoean Search Report in co-pending European Patent Application No. 19911659.1 dated Sep. 20, 2022 (23 pages).
International Search Report for co-pending International Application No. PCT/KR2019/014069 (dated Jan. 30, 2020).
International Search Report for PCT Application No. PCT/KR2019/014069 dated Jan. 30, 2020, 4 pages.
Office Action for KR 1020190009430 dated Feb. 25, 2019.
Office Action for KR10-2018-0152222 dated Jan. 10, 2019.
Office Action for KR1020190039773 dated Jul. 1, 2019.
Office Action for KR1020190039773 dated Oct. 17, 2019.
Office Action in co-pending application TW108124144 dated May 11, 2020, 10 pages.
Potentially related U.S. Appl. No. 16/572,902, filed Sep. 27, 2019.
Potentially related U.S. Appl. No. 16/666,834, filed Oct. 29, 2019.
Potentially related U.S. Appl. No. 16/666,852, filed Oct. 29, 2019.
Search Report for Patent Application No. 108124144 (completion date of the search: Feb. 17, 2020); 2 pages.
Office Action in co-pending Application JP2021542451 dated Mar. 7, 2023 (8 pages).
Office Action issued in co-pending Application No. CN201980090092.8 dated May 4, 2023 (11 pages).

* cited by examiner

[Fig. 1]
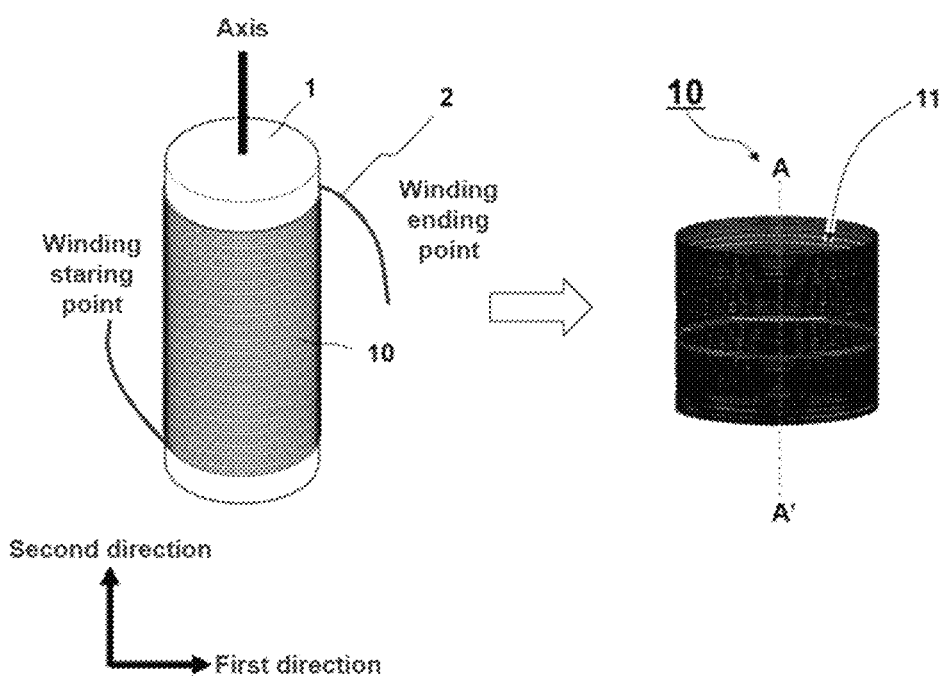
[Fig. 2]
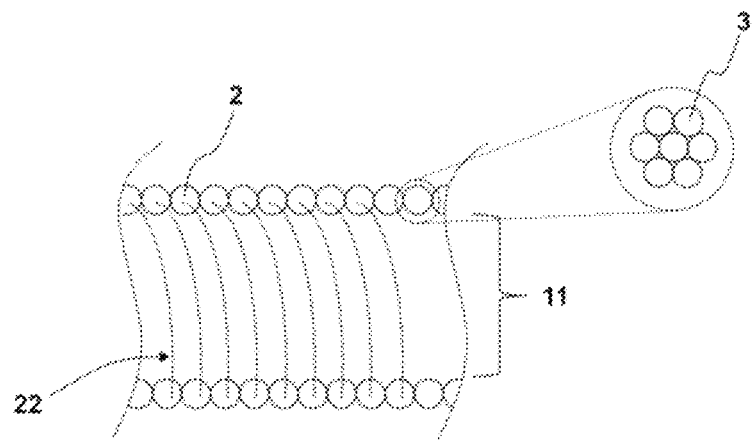

[Fig. 3]
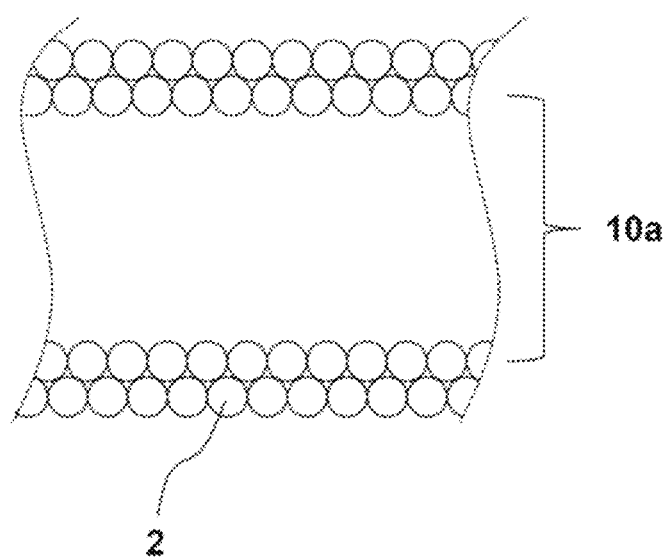
[Fig. 4]
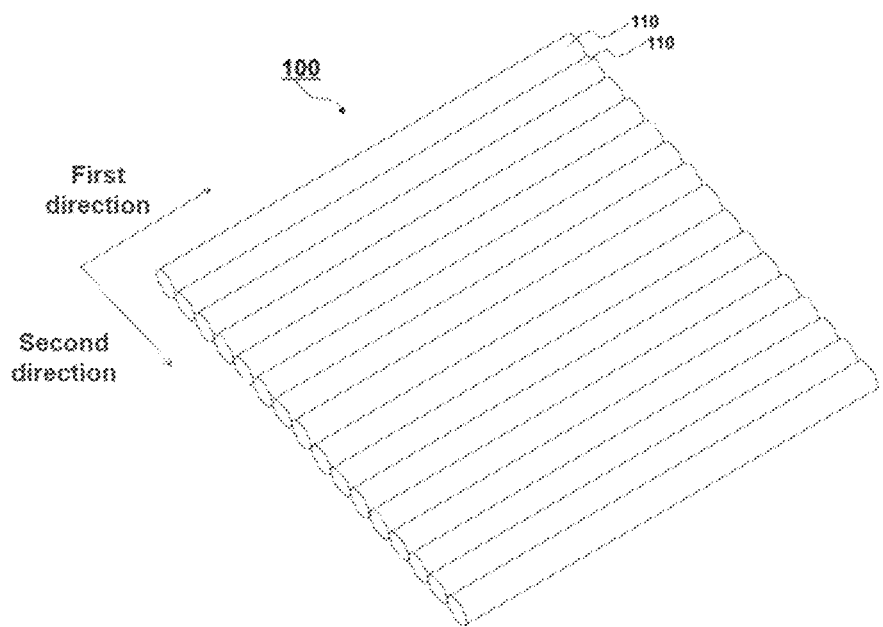

[Fig. 5]
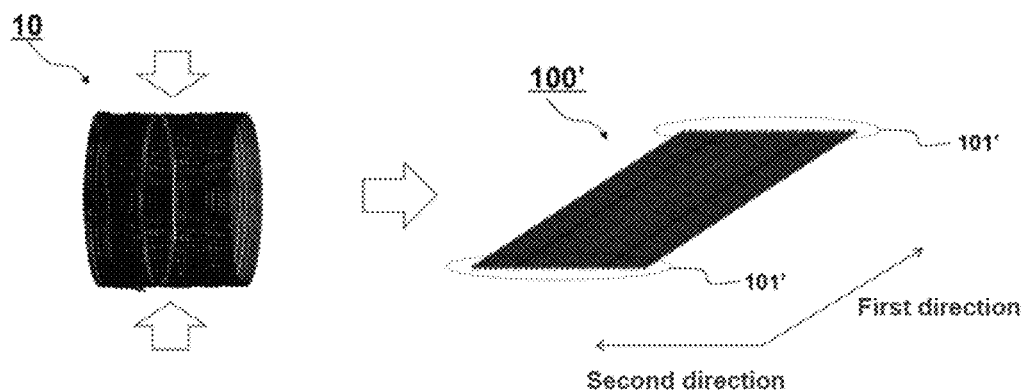
[Fig. 6]
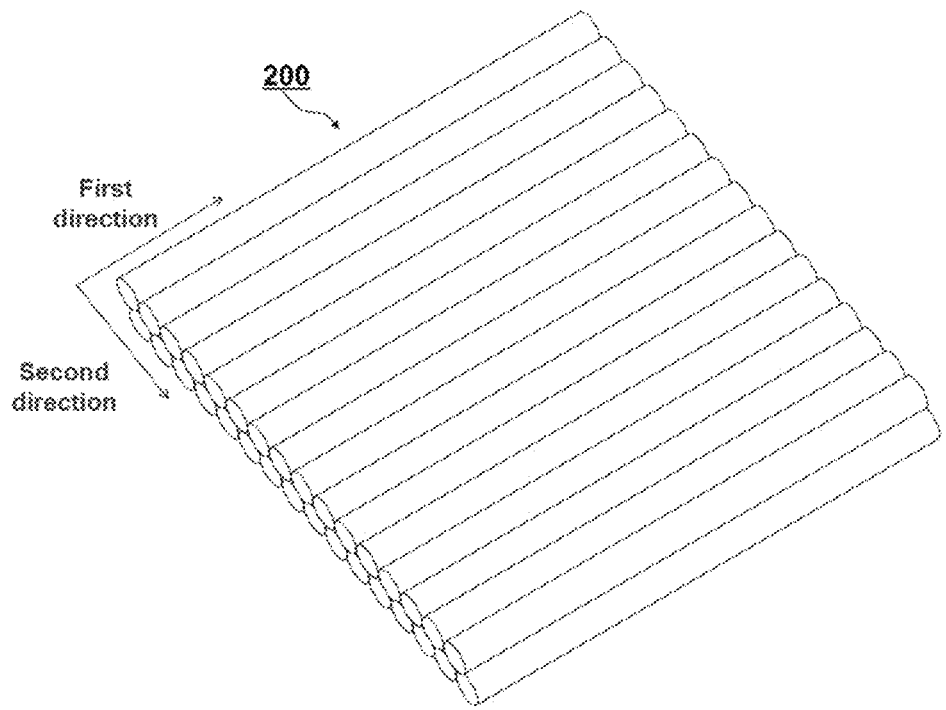

[Fig. 7]
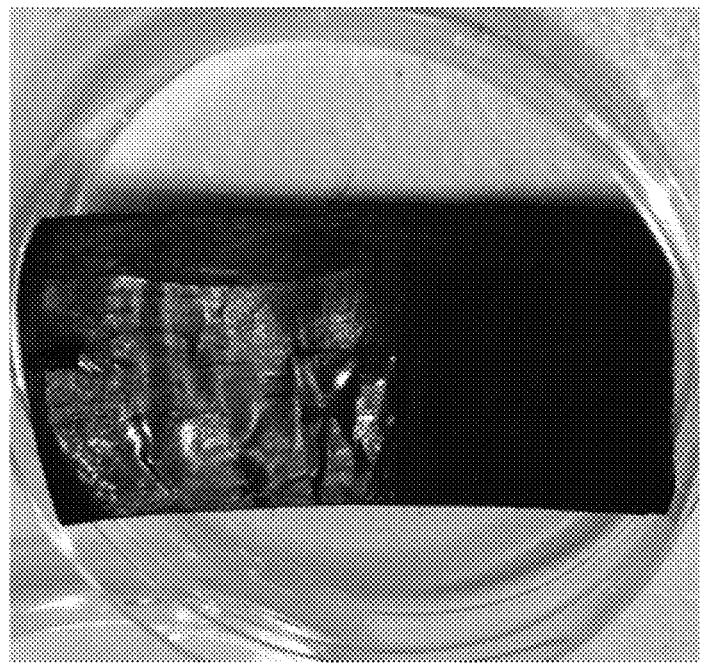
[Fig. 8]

[Fig. 9]
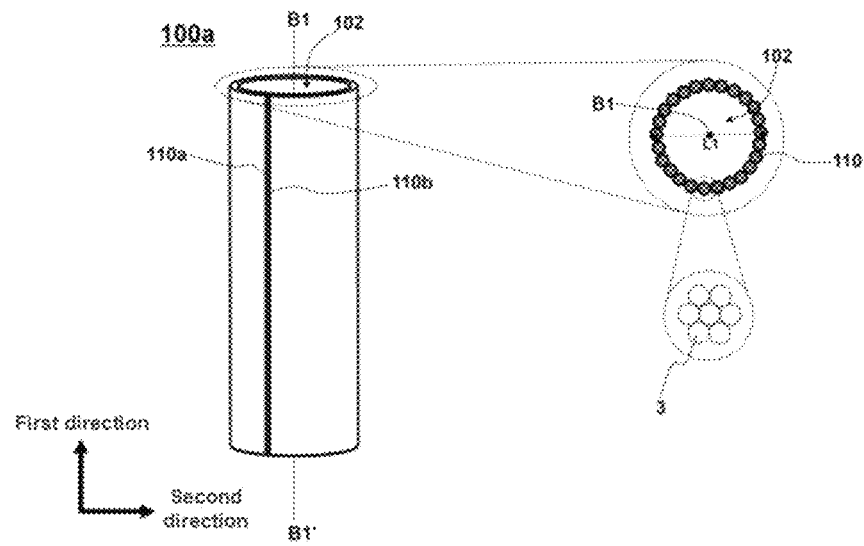
[Fig. 10]
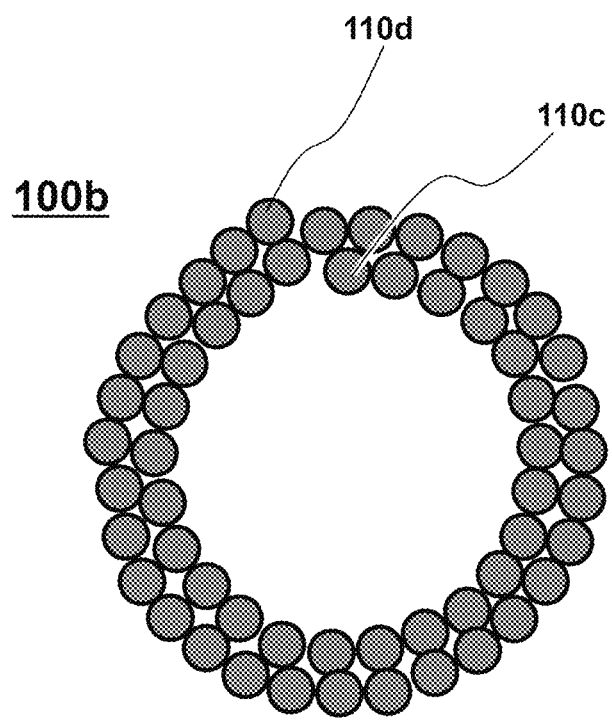

[Fig. 11]
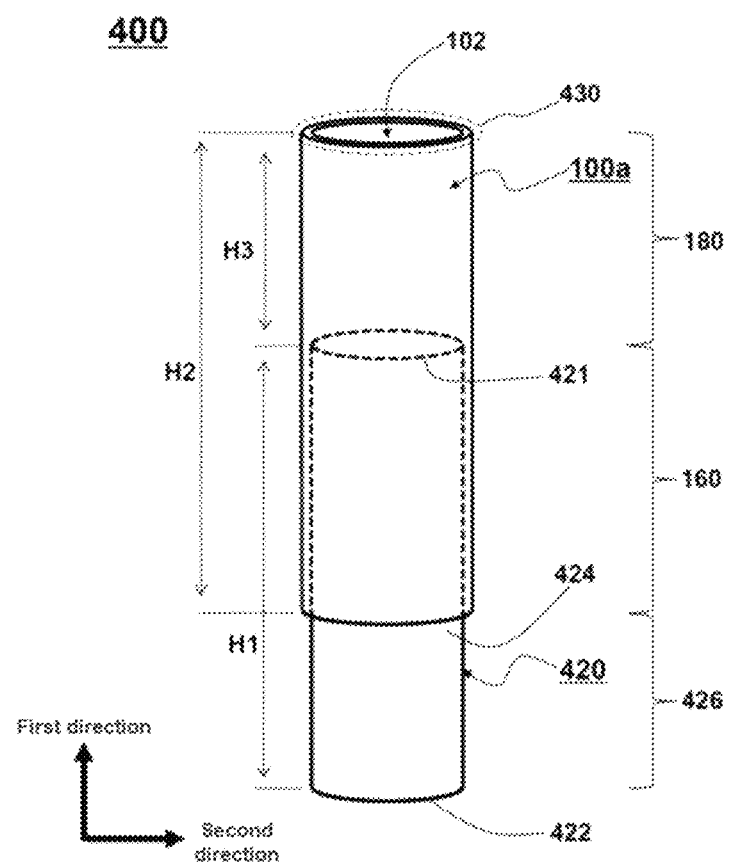

[Fig. 12]
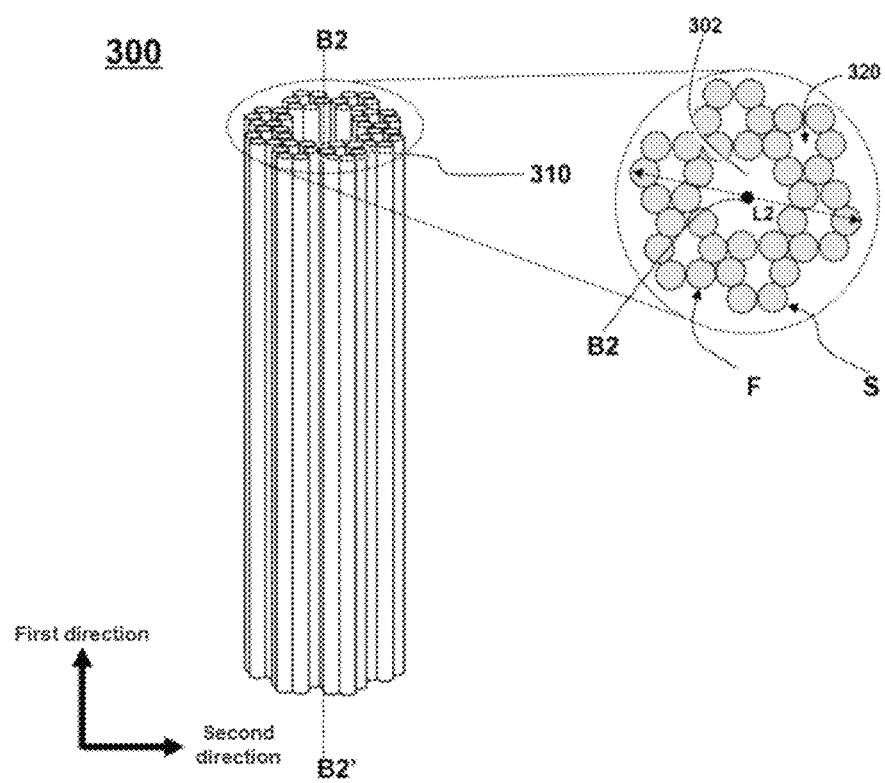

[Fig. 13]
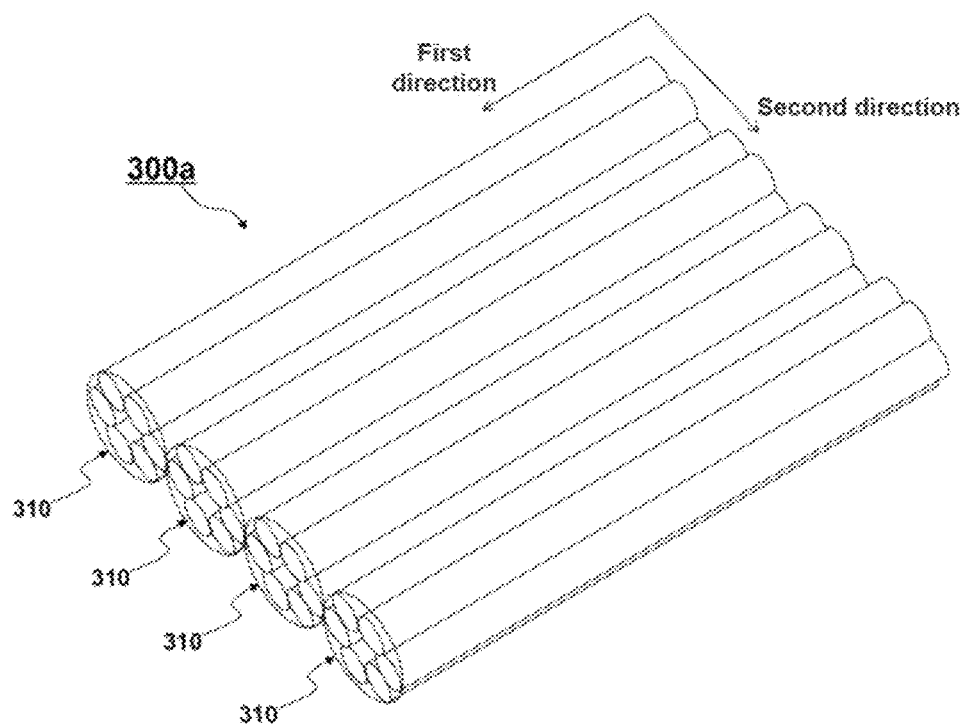
[Fig. 14]
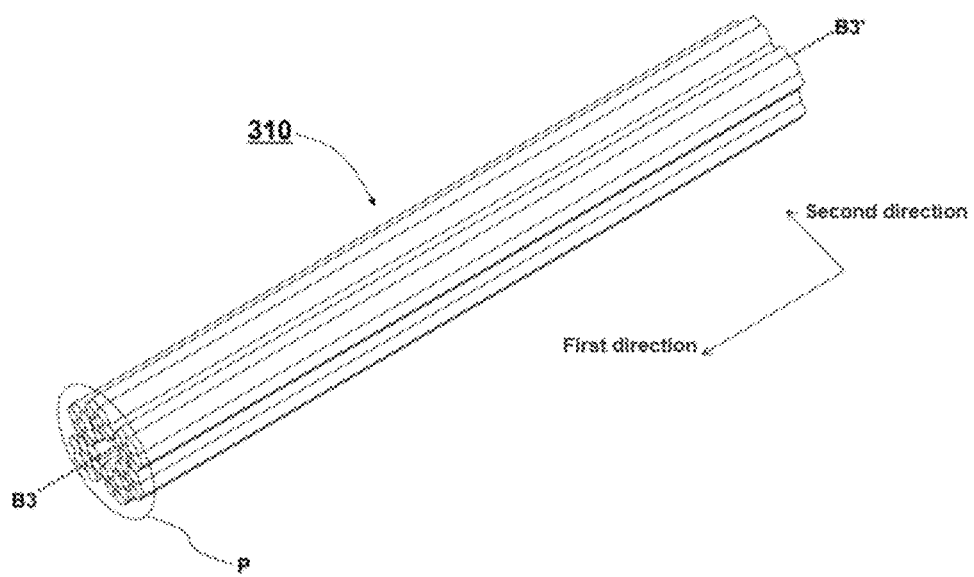

[Fig. 15]
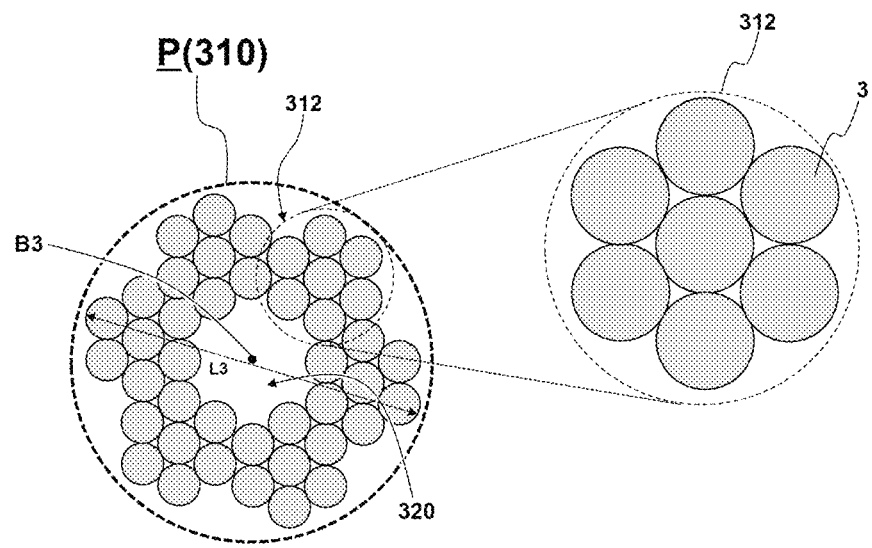
[Fig. 16]
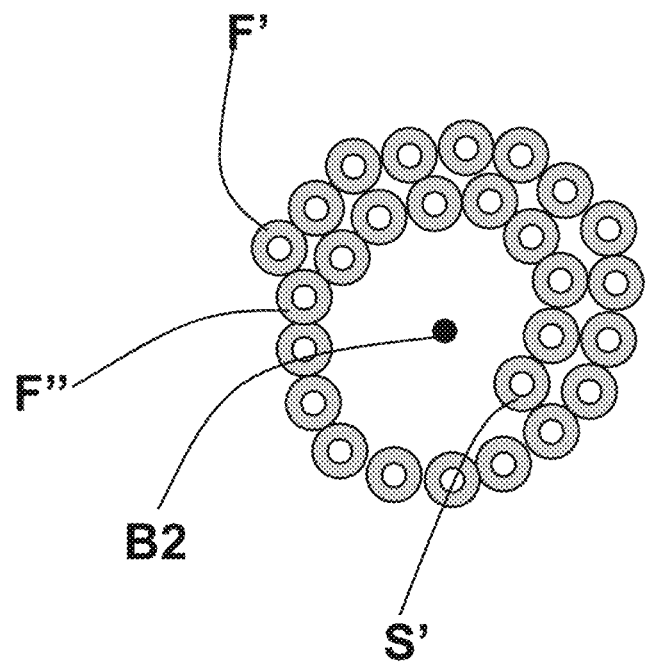

[Fig. 17]
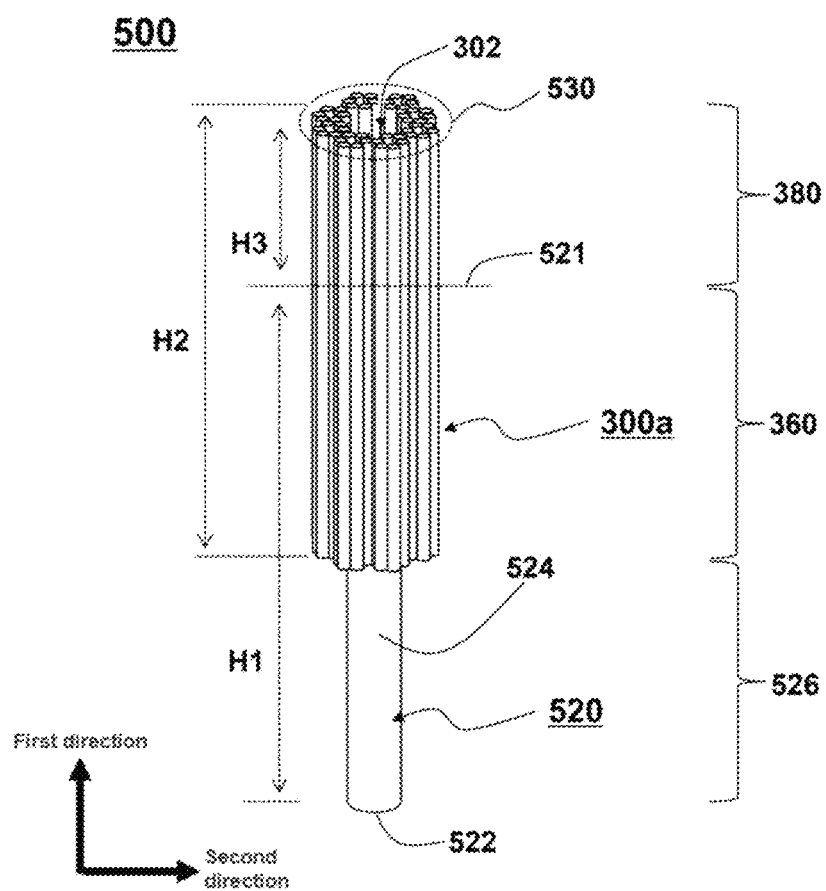

EMITTER WITH EXCELLENT STRUCTURAL STABILITY AND ENHANCED EFFICIENCY OF ELECTRON EMISSION AND X-RAY TUBE COMPRISING THE SAME

CROSS-REFERENCE TO RELATED APPLICATIONS

This application is a divisional application of U.S. application Ser. No. 16/666,844 filed on Oct. 29, 2019, which claims priority to Korea Patent Application No. 1020190009430 filed on Jan. 24, 2019, the entire disclosures of which are incorporated herein by reference in their entirety.

TECHNICAL FIELD

The present invention relates to an emitter with excellent structural stability and enhanced efficiency of electron emission and an X-ray tube comprising the same.

BACKGROUND ART OF THE INVENTION

A field emission device has a structure in which electrons emitted from a cathode under vacuum are accelerated and attracted to an anode. Representative examples of such a device include an illumination that generates a visible light by applying a fluorescent material to an emitter as a cathod, an X-ray tube that generates X-rays as electrons emitted from emitter collide with a metal target as an anode, and the like.

An X-ray tube among the above is used in a variety of industries, such as medical, food, water purification, security, and the like, in order to identify what cannot be observed by the naked eyes.

The performance of an X-ray tube significantly hinges upon the performance of electron emission of the emitter. Recently, carbon nanotubes (CNTs) have attracted much attention as an emitter material having excellent characteristics of electron emission.

Carbon nanotubes have an electrical conductivity similar to that of metals and are excellent in physical and chemical stability and mechanical strength. They are advantageous in the emission of electrons from the front ends thereof by virtue of their large aspect ratios with a diameter of nanoscale and a length of more than 1,000 times the diameter.

In addition, when an electric field is applied to carbon nanotubes, they can emit electrons from the front ends thereof based on the electric field concentrated thereon and their excellent electrical conductivity. In such event, since the required field enhancement factor is excellent, electrons can be readily emitted even relatively low electric field.

Carbon nanotubes have been processed into various structures and used as emitters for the purpose of increasing the efficiency of electron emission by virtue of these characteristics.

One example on the above is to utilize a carbon nanotube fiber strand in which a plurality of carbon nanotubes are aggregated by the $\pi$-$\pi$ interaction.

A carbon nanotube fiber has an advantage of facilitating the emission of electrons from the front end thereof—that is, electrons can be emitted in a specific direction in which the front end is directed since electrons are concentrated at the front end. But it has a disadvantage that its shape is easily folded or bent, which impairs its durability.

In another aspect, the area where electrons are distributed immediately upon the emission thereof substantially corresponds to the cross-sectional area of the fiber. Since the fiber can hardly be formed to a structure having a large cross-sectional area, the emission range of electrons is very limited.

This is attributable to the fact that it is difficult to increase the diameter of a fiber beyond a certain level by aggregating carbon nanotubes by the $\pi$-$\pi$ interaction. For this reason, the use of a carbon nanotube fiber is limited to a small X-ray tube.

In order to address this problem, an emitter has been developed that uses a carbon nanotube sheet in the shape of a sheet (or film) and has a small deformation of shape and a relatively large electron emission range as compared with the fiber type as described above.

A conventional carbon nanotube sheet is prepared by coating or scattering a carbon nanotube paste on to the upper side of a substrate and drying and/or pressing the same. In an emitter prepared thereby, electrons are emitted from the edges of the sheet and the front ends of the carbon nanotubes arranged in the sheet.

However, when a carbon nanotube paste is coated or scattered on to the upper side of a substrate, the carbon nanotubes may be randomly arranged and aggregated in various directions. As a result, a carbon nanotube sheet thus prepared is a nonwoven fabric in which carbon nanotubes are arranged and aggregated substantially in a random manner. Thus, when an electric field is applied to the carbon nanotube sheet prepared, electrons are also emitted from the front ends of the carbon nanotubes randomly protruding from the carbon nanotube sheet, which not only makes it difficult to emit electrons in a specific direction, but also involves a serious defect that the efficiency of electron emission is very low.

Therefore, there is a demand for an emitter capable of improving the technical problems described above.

DISCLOSURE OF THE INVENTION

Technical Problem to be Solved

In one aspect of the present invention, there is provided an emitter, which comprises a first tube composed of a carbon nanotube sheet that comprises plurality of unit yarns having a structure in which a plurality of carbon nanotubes are aggregated and extend in a first direction.

The first tube may be in the form of a pipe having a first internal space in which the carbon nanotube sheet is rolled about an imaginary first axis parallel to the first direction. In such event, the respective front ends of the unit yarns may be oriented in the same direction as the axis.

In another aspect of the present invention, there is provided an emitter, which comprises a second tube in which a plurality of the first tubes are arranged to form a pipe shape.

The second tube may comprise a second internal space formed by arranging the plurality of first tubes about an imaginary second axis parallel to the first direction. The respective front ends of the first tubes may be oriented in the same direction as the axis. Thus, the second tube may be in the form of multiple pipes, which comprises the second internal space formed by arranging the first tubes and the first internal space that the first tube comprises.

The emitter according to the aspects may be the first be itself or the second tube itself. That is, the emitter may be a composite structure of carbon nanotubes in the form of a pipe.

The emitter, which is a composite structure of carbon nanotubes, have a structure in which the front ends of the carbon nanotubes and the unit yarns are oriented in the same direction as the imaginary first and second axes parallel to the first and second internal spaces and form the front ends of the composite structure carbon nanotubes.

This has the advantage that most of the electrons emitted from the front ends of the structure can be emitted in the first direction in which the respective carbon nanotubes and unit yarns extend. That is, the emitter of the present invention has a structure that is easy to induce most electrons to be emitted in a certain direction. For example, when it is applied to an X-ray tube that generates X-rays through a collision of electrons with a metal target, there is a significant advantage in that most electrons can be concentrated at the desired collision spot.

This contrasted with a conventional carbon nanotube sheet in which electrons are emitted in arbitrary directions in which the carbon nanotubes are arranged. Thus, the emitter according to the aspects can solve the problems of the conventional technologies.

In addition, the emitter according to the aspects, which has a structure in the form of a pipe, may have a relatively large cross-sectional area as compared with the conventional carbon nanotube fibers in which electrons are emitted from a single strand or several strands of unit yarns.

Since the cross-sectional area may correspond to the emission range of electrons, the emitter according to the aspects may have a wider mission range of electrons than that of the conventional technologies and can control the diameter thereof to a desired level.

In another aspect of the present invention, there is provided an emitter, which further comprises a conductive wire, in which the emitter is the composite structure of carbon nanotubes, that is, the structure in which the first tube and/or the second tube surrounds and contacts at least a part of the conductive wire.

In such an emitter, the composite structure of carbon nanotubes can be supported by the conductive wire. Since it is possible to suppress such an undesirable phenomenon as folding or bending of the composite structure of carbon nanotubes that actually emits electrons, the conventionally recognized problems can be solved.

Solution to the Problem

Before the present invention is specifically described, the terms and words used in the present specification and claims should not be construed as limited to ordinary or dictionary terms. They must be construed in accordance with the technical idea of the present invention based on the principle that an inventor is allowed to appropriately define the concept of terms in order to explain its own invention in the best way.

Accordingly, it is to be understood that the constitution of the embodiments described in the present specification is merely the most preferred embodiment of the present invention and does not represent all the technical ideas of the present invention; thus, various equivalents and changes for substituting them at the time of filing the present application can be made.

As used herein, a singular expression covers a plural expression unless the context clearly dictates otherwise. In this specification, it is to be understood that the terms "comprise," "provide," "have," and the like indicate the presence of features, numbers, steps, elements, or combinations thereof performed; and that they do not exclude the presence of the possibilities of addition of one or more of other features, numbers, steps, elements, or combinations thereof.

As used herein, the term "introduction" may be described interchangeably with "feed" and "injection," and it may be understood to mean the input or addition of a liquid, a gas, heat, or the like.

As used herein, the term "aggregation" is used interchangeably with "gathering, collection, binding" and refers to a form in which a plurality of carbon nanotubes are attached to one another by the n-n interaction.

As used herein, the term "yarn" refers to any yarn formed by the growth of carbon nanotubes in a fiber form or by gathering, aggregation, and/or fusion of a plurality of carbon nanotubes in a fiber form.

As used herein, the term "base end" may refer to an end of an object or a target or a direction toward the end with respect to an arbitrary reference direction. The "front end" may refer to the other end or a direction toward the other end with respect to the arbitrary reference direction. Here, the base end may include an end, a proximal end, and/or a part that is very close to an end that constitutes an object or a target. The front end may include an end, a distal end, and/or a part that is very close to an end, which is opposite to the base end. These base end and front end may be recognized as a concept of a pair and may be distinguished from other ends, distal ends and/or parts that are very close to the ends.

In an embodiment, the present invention provides an emitter, which comprises a first tube composed of a carbon nanotube sheet that comprises a plurality of unit yarns having a structure in which a plurality of carbon nanotubes are aggregated and extend in a first direction, wherein the first tube is in the form of a pipe having a first internal space in which the carbon nanotube sheet is rolled about an imaginary first axis parallel to the first direction, and the respective front ends of the unit yarns are oriented in the same direction as the axis.

In one specific example, in the first tube, the carbon nanotube sheet is rolled such that no overlapping portion exists from the rolling starting point to the rolling ending point, and the starting point and the ending point may be fixed by the π-π interaction while they are contiguous to each other.

In one specific example, in the first tube, the carbon nanotube sheet is rolled such that an overlapping portion exists from the rolling starting point to the rolling ending point, and the unit yarns in the overlapping portion may be fixed by the π-π interaction while they are contiguous to each other.

In one specific example, in the first tube, the thickness between the inner side that forms the first internal space and the outer side exposed to the outside on a transverse cross-section may be 1 micrometer to 2,000 micrometers.

In one specific example, the transverse cross-section of the first tube may have a shape selected from the group consisting of a circle, an ellipse, a semicircle, and a polygon, and the longest line that passes through the imaginary first axis on the transverse cross-section of the first tube and connects the opposing contours of the cross-section may have a length of 3 micrometers to 2 centimeters.

In one specific example, the first internal space may have a structure in which both ends in the first direction are opened, and the open ends are communicated with each other.

In one specific example, the emitter further comprises a conductive wire that occupies at least a part of the first internal space, and at least a part of the first tube surrounds and contacts at least a part of the conductive wire.

In one specific example, the conductive wire may extend in the first direction and comprise a first end of the front end side, a second end of the base end side, and an outer peripheral side that extends in the first direction between the peripheries of the first end and the second end, wherein the length in the first direction between the first end and the second end of the conductive wire is defined as a first height, and the conductive wire is inserted into the first internal space as it is in contact with at least a part of the first tube while the first height coincides with the first direction.

In one specific example, the first tube may comprise a first region that overlaps with the conductive wire and a second region that does not overlap with the conductive wire in the first direction; and the emitter may emit electrons from the front end in the second region.

In one specific example, the emitter may comprise a second height that is the length between both ends of the first tube in the first direction, and a third height that is the length between both ends of the second region in the first direction, wherein the ratio of the third height to the second height (=third height/second height) may be 0.1 to 0.9.

In one specific example, the conductive wire may have a region of margin in which the first tube is not present on at least a part of the outer peripheral side of the wire adjacent to the second end.

In one specific example, the carbon nanotube sheet may comprise an arrangement structure in which the arrangement of the unit yarns located side by side is repeated in a second direction perpendicular to the first direction in a state in which the sides of one unit yarn of the plurality of unit yarns are contiguous with the sides of its neighboring unit yarns.

In one specific example, the conductive wire may have a transverse cross-section in a shape selected from the group consisting of a circle, an ellipse, a semicircle, and a polygon, wherein the longest line that passes through the center on the transverse cross-section and connects the contours of the cross-section may have a length of 3 micrometers to 2 centimeters.

In one specific example, the conductive wire may be composed of one metal selected from the group consisting of tungsten, copper, nickel, stainless steel, and molybdenum, or an alloy of two or more thereof.

In an embodiment, the emitter comprises a second tube in which a plurality of the first tubes are arranged to form a pipe shape, wherein the second tube comprises a second internal space formed by arranging the plurality of first tubes about an imaginary second axis parallel to the first direction, the second internal space has a structure in which both ends in the first direction are opened and the open ends are communicated with each other, and the respective front ends of the first tubes are oriented in the same direction as the axis.

In one specific example, the second tube may be composed of a structure in which the arrangement of the first tubes located side by side is repeated to surround the imaginary second axis parallel to the first direction in a state in which the sides of one first tube of the plurality of first tubes are contiguous with the sides of its neighboring first tubes.

In one specific example, in the second tube, the first tubes may be arranged such that there exists no overlapping portion, the first tubes at the arrangement starting point and at the arrangement ending point are contiguous to each other, and the contiguous first tubes are fixed by the π-π interaction.

In one specific example, in the second tube, the first tube at the arrangement ending point is contiguous to the other first tube spaced apart from the first tube at the arrangement starting point, an overlapping portion exists between the first tube at the arrangement starting point and the first tube at the arrangement ending point, and the first tubes in e overlapping portion may be fixed by the π-π interaction.

In one specific example, in the second tube, the thickness between the inner side that forms the second internal space and the outer side exposed to the outside on a transverse cross-section may be 5 micrometers to 5,000 micrometers.

In one specific example, the transverse cross-section of the second tube may have a shape selected from the group consisting of a circle, an ellipse, a semicircle, and a polygon, the longest line that passes through the center on the transverse cross-section of the second tube and connects the opposing contours of the cross-section may have a length of 100 micrometers to 2 centimeters, the transverse cross-section of the first tube may have a shape selected from the group consisting of a circle, an ellipse, a semicircle, and a polygon, and the longest line that passes through the center on the transverse cross-section of the first tube and connects the opposing contours of the cross-section may have a length of 5 micrometers to 200 micrometers.

In one specific example, the emitter further comprises a conductive wire that occupies at least a part of the second internal space, and at least a part of the second tube surrounds and contacts at least a part of the conductive wire.

In one specific example, the conductive wire may extend in the first direction and comprise a first end of the front end side, a second end of the base end side, and an outer peripheral side that extends in the first direction between the peripheries of the first end and the second end, wherein the length in the first direction between the first end and the second end of the conductive wire is defined as a first height, and the conductive wire is inserted into the second internal space as it is in contact with at least a part of the second tube while the first height coincides with the first direction.

In one specific example, the second tube may comprise a first region that overlaps with the conductive wire and a second region that does not overlap with the conductive wire in the first direction; and the emitter may emit electrons from the front end in the second region.

In one specific example, the emitter may comprise a second height that is the length between both ends of the second tube in the first direction, and a third height that is the length between both ends of the second region in the first direction, wherein the ratio of the third height to the second height (=third height/second height) may be 0.1 to 0.9.

In one specific example, the conductive wire may have a region of margin in which the second tube is not present on at least a part of the outer peripheral side of the wire adjacent to the second end.

In one specific example, the conductive wire may have a transverse cross-section in a shape selected from the group consisting of a circle, an ellipse, a semicircle, and a polygon, wherein the longest line that passes through the center on the transverse cross-section and connects the contours of the cross-section may have a length of 100 micrometers to 2 centimeters.

In one specific example, the conductive wire may be composed of one metal selected from the group consisting of tungsten, copper, nickel, stainless steel, and molybdenum, or an alloy of two or more thereof.

Advantageous Effects of the Invention

The emitter of the present invention may comprise a first tube composed of a carbon nanotube sheet that comprises a plurality of unit yarns having a structure in which a plurality of carbon nanotubes are aggregated and extend in a first direction.

The first tube may be in the form of a pipe having a first internal space in which the carbon nanotube sheet is rolled about an imaginary first axis parallel to the first direction. In such event, the respective front ends of the unit yarns may be oriented in the same direction as the axis.

In addition, the emitter of the present invention may comprise a second tube in which a plurality of the first tubes are arranged to form a pipe shape.

The second tube may comprise a second internal space formed by arranging the plurality of first tubes about an imaginary second axis parallel to the first direction, wherein the respective front ends of the first tubes may be oriented in the same direction as the axis. Thus, the second tube may be in the form of a multiple pipe, which comprises the second internal space formed by arranging the first tubes and the first internal space that the first tube comprises.

The emitter according to the aspects may be the first tube itself or the second tube itself. That is, the emitter may be a tube structure in the form of a pipe.

In the emitter, the front ends of the carbon nanotubes and the unit yarns are oriented in the same direction as the imaginary first and second axes parallel to the first and second internal spaces and form the front ends of the tube structure. This has the advantage that most of the electrons are emitted from the front ends of the tube structure in the first direction in which the respective carbon nanotubes and unit yarns extend. That is, the emitter of the present invention has a structure that is easy to induce most electrons to be emitted in a certain direction. For example, when the emitter is applied to an X-ray tube that generates X-rays through a collision of electrons with a metal target, there is a significant advantage in that most electrons can be concentrated at the desired collision spot.

This contradicts an emitter that adopts a conventional carbon nanotube sheet in which electrons are emitted in arbitrary directions in which the carbon nanotubes are arranged. Thus, the emitter according to the aspects can solve the problems of the conventional technologies.

In addition, since the emitter of the present invention emits electrons from the front end of the tube structure in the form of a pipe, it may have a wider emission range of electrons than that of the conventional carbon nanotube sheets in which electrons are emitted from the unit yarns. It is also possible to adjust the discharge range as desired by adjusting the diameter of the pipe form.

In addition, the emitter of the present invention may further comprise a conductive wire. The conductive wire supports the first tube and the second tube, thereby suppressing the unfavorable phenomena that the first tube and the second tube that emit electrons are bent or folded. Thus, the emitter of the present invention can solve the problems of the conventional technologies.

BRIEF DESCRIPTION OF THE DRAWINGS

FIG. 1 shows schematic diagrams of a sheet preform for the preparation of a carbon nanotube sheet according to the present invention.

FIG. 2 is a longitudinal cross-sectional view of a sheet preform according to an example.

FIG. 3 is a longitudinal cross-sectional view of a sheet preform according to another example.

FIG. 4 is a schematic diagram of a carbon nanotube sheet according to an example of the present invention.

FIG. 5 is a schematic diagram of a process for preparing a carbon nanotube sheet.

FIG. 6 is a schematic diagram of a carbon nanotube sheet according to another example of the present invention.

FIG. 7 is a photograph of a carbon nanotube sheet according to FIG. 4.

FIG. 8 is a photograph of a carbon nanotube sheet according to FIG. 6.

FIG. 9 is a schematic diagram of an emitter comprising a first tube according to an example of the present invention.

FIG. 10 is a schematic diagram of an emitter comprising a first tube according to another example of the present invention.

FIG. 11 is a schematic diagram of an emitter comprising a first tube according to still another example of the present invention.

FIG. 12 is a schematic diagram of an emitter cot rising a first tube according to still another example of the present invention.

FIG. 13 is a schematic diagram of a first tube bundle for preparing a second tube of FIG. 12.

FIG. 14 is a schematic diagram of a first tube of FIG. 13.

FIG. 15 is a schematic plan diagram of the enlarged "P" FIG. 14.

FIG. 16 is a schematic diagram of an emitter comprising a first tube according to another example of the present invention.

FIG. 17 is a schematic diagram of an emitter comprising a first tube according to still another example of the present invention.

DETAILED DESCRIPTION FOR CARRYING OUT THE INVENTION

<Carbon Nanotube Sheet>

The emitter of the present invention may comprise a carbon nanotube sheet.

The process of preparing a carbon nanotube sheet and its detailed structure are schematically shown in FIGS. 1 to 8.

Referring to FIG. 1, a carbon nanotube sheet may be prepared from r a sheet preform (10).

The sheet preform (10) may be prepared by winding a yarn (2) that comprises a plurality of carbon nanotubes and has an elongated length extending in a first direction using a winding means (1), e.g., a bobbin, that is rotating about an axis and releasing the wound yarn (2) from the winding means (1).

The yarn (2) has a fiber form in which one carbon nanotube is grown long. Alternatively, the yarn (2) has a fiber form in which the sides of a plurality of carbon nanotubes are aggregated by the π-π interaction substantially in a long cylindrical shape (a cylindrical shape with a filled central portion or a cylindrical shape with a void central portion). The carbon nanotubes (3) and the yarn (2) composed thereof may be aligned in the same direction.

The sheet preform (10) may be in the form of a hollow pipe with the sides of the yarn are continuously and contiguously wound in a second direction parallel to the axis and having an internal space (11).

FIGS. 2 and 3 schematically show a cross-sectional view of a sheet preform (10). Referring to them along with FIG. 1, when the yarn (2) is wound, the yarn (2) may be wound in two or more turns (22) along the outer periphery of the winding means (1), and the intervals between the yarns (2) required to wind the respective turns (22) from the winding start to the end may be substantially uniform. In the sheet preform (10) in the form of a pipe, the intervals between the yarn (2) and the yarn (2) continuously and contiguously wound may be substantially uniform.

When each turn (22) is deemed as a unit for the sheet preform (10), all the turns (22) are continuously aligned in the second direction. As a result, the yarn (2) that forms respective turns (22) has an arrangement structure aligned continuously in the second direction. This arrangement structure may form an arrangement structure of a carbon nanotube sheet to be described later.

The sheet preform (10) may also be self-supportive by itself, which may be attributable to the tightly wound yarn (2) that has the π-π relationship between the neighboring turns.

The sheet preform (10) described above may be a single-layered pipe shape (10a) (FIG. 2) that has one of the structure in which the sides of the yarn (2) are arranged continuously and contiguously or a multi-layered pipe shape (10b) (FIG. 3) in which two or more of the single-layered pipe shape (10a) are superposed.

The single-layered pipe shape (10a) may be obtained by winding the yarn (2) one time around the winding means (1) such that the sides of the yarn are arranged continuously and contiguously in the second direction.

The multi-layered pipe shape (10b) may be obtained by further winding the yarn (2) one or more times again around the single-layered pipe shape (10a) already formed such that the sides of the yarn are arranged continuously and contiguously in the second direction.

The sheet preform (10) thus prepared may be cut and/or pressed to prepare a plate-shaped carbon nanotube sheet.

For example, when the sheet preform (10) of FIG. 1 is cut along the imaginary axis A-A' one yarn (2) constituting the sheet preform (10) is divided to form a plurality of yarns (i.e., unit yarns). In such event, the arrangement structure of the yarn aligned in the sheet preform (10) may be maintained in the carbon nanotube sheet as well.

In this regard, a carbon nanotube sheet obtained cult is schematically shown in FIG. 4.

Referring to FIGS. 1 to 4, at least a part of the sheet preform (10) is cut along the second direction (A-A' in FIG. 1) so that no pipe-shaped yarn (2) exists, whereby a carbon nanotube sheet (100) may be prepared.

The carbon nanotube sheet (100) thus prepared is derived from the cutting of the sheet preform (10) and may comprise a plurality of unit yarns (110) extending between the opposite ends thereof in the first direction perpendicular to the second direction.

In addition, the carbon nanotube sheet (100) may have an arrangement structure in which the arrangement of the plurality of unit yarns (110) located side by side is repeated in the second direction in a state in which the sides of one unit yarn (110) of the plurality of unit yarns (110) are contiguous with the sides of its neighboring unit yarns (110).

A photograph of a carbon nanotube sheet prepared as described above is shown in FIG. 7. Referring to FIG. 7, it is noted that the carbon nanotube sheet of the present in has a very smooth surface.

Meanwhile, a carbon nanotube sheet (100') obtained by pressing is schematically shown in FIG. 5.

The pressing is a method in which a part of the sheet preform (10) is folded such that the pipe shape is deformed to be flat, thereby forming a carbon nanotube sheet (100'). The pressing may be performed by placing the sheet preform (10) between two plate members and then pressing the two plate members toward the sheet preform (10) or by passing a sheet preform (10) between two adjacent rollers to press it, but it is not limited thereto.

Referring to FIGS. 1 to 5, the folding positions may form two edges (101') parallel to each other on the outer periphery of the sheet (100') when the carbon nanotube sheet (100') is viewed from the top.

The yarn (2) in an integrated state at an angle of substantially 180 degrees without being cut at the folding positions may form the carbon nanotube sheet (100'). In one example on the above, a sheet preform (10) may be pressed such that the inner sides of the sheet preform (10) opposite to each other with an internal space (11) interposed between them are superposed to prepare the carbon nanotube sheet (100').

The carbon nanotube sheet (100') may comprise a plurality of unit yarns extending between the opposite ends thereof in the first direction without being cut by pressing when viewed from the top.

In addition, the carbon nanotube sheet (100') may have an arrangement structure in which the arrangement of the plurality of unit yarns located side by side is repeated in the second direction in a state in which the sides of one unit yarn of the plurality of unit yarns are contiguous with the sides of its neighboring unit yarns. The unit yarns and the arrangement structure may be the same as those in FIG. 4. For reference, a photograph of a carbon nanotube sheet prepared as described above is shown in FIG. 8.

In some cases, once at least a part of the sheet preform (10) has been cut along the imaginary line A-A', the other portion of the sheet preform (10) having the longest distance from the cutting position, that is, the opposite portion of the A-A' cutting position in the pipe shape, is folded at an angle of substantially 180 degrees so that both sides of the pipe overlap with each other at the folded position, thereby preparing a carbon nanotube sheet.

The carbon nanotube sheet prepared as described above may have a first configuration (100 in FIG. 4) or a second configuration (200 in FIG. 6). The first configuration has one of the arrangement structure in which the arrangement of the plurality of unit yarns located side by side is repeated in the second direction in a state in which the sides of one unit yarn of the plurality of unit yarns are contiguous with the sides of its neighboring unit yarns. In the second configuration, two or more of the arrangement structure are superposed.

In one aspect of the present invention, the first configuration (100) may be obtained by cutting a sheet preform (10) in a single-layered pipe shape (10a) prepared by winding a yarn one time around the winding means (1) such that the sides of the yarn are arranged continuously and contiguously in the second direction.

In another aspect of the present invention, when a sheet preform (10) in a single-layered pipe shape (10a) or a multi-layered pipe shape (10b) is pressed, the unit yarns of the upper part in an arrangement structure be inserted between the unit yarns of the lower part in an arrangement structure, and the two arrangement structures are pressed and combined to form a first configuration (100) having a single arrangement structure.

In one aspect of the present invention, the second configuration (200) may be obtained by pressing a sheet preform (10) in a single-layered pipe shape (10a) or a multi-layered pipe shape (10b).

In another aspect of the present invention, the second configuration (200) may be obtained by cutting a sheet form (10) in a multi-layered pipe shape (10b) to form a first configuration (100), followed by pressing the first configuration to be folded.

The carbon nanotube sheet thus prepared may be self-supportive by itself like the sheet preform as described above; thus, it can maintain its shape without a separate support such as a substrate.

This is because the yarn regularly aligned in a sheet preform forms the arrangement structure according to the present invention, that is, the arrangement structure in which the arrangement of the plurality of unit yarns located side by side is repeated in the second direction. This may also be attributable to the fact that the carbon nanotube sheet having the arrangement structure is excellent the π-π interactions between the unit yarns.

In the present invention, the diameter of the unit yarn may be selected from the range of 1 micrometer to 700 micrometers, specifically 10 micrometers to 300 micrometers.

When the diameter is within the above range, the π-π interaction between the unit yarns may be maximized.

<First Tube>

The emitter of the present invention may be characterized in that it is in the form of a pipe having a first internal space in which the carbon nanotube sheet as described above is rolled about an imaginary first axis parallel to the first direction.

An example on the above is schematically shown in FIG. 9. FIG. 9 shows a first tube in which, for example, the carbon nanotube sheet according to FIG. 4 is rolled.

Referring to FIG. 9, the first tube (100a) is rolled about an imaginary first axis (B1-B1') to surround the axis parallel to the first direction in which the unit yarns (110) of the carbon nanotube sheet (100) extend. Thus, the first tube comprises a first internal space (102) communicated along the first axis (B1-B1') while it is rolled. The arrangement of the plurality of unit yarns (110) located side by side is repeated to surround the first axis (B1-B1') parallel to the first direction in a state in which the sides of one unit yarn (110) of the plurality of unit yarns (110) are contiguous with the sides of its neighboring unit yarns (110).

That is, the first internal space (102) may have a structure in which both ends in the first direction are opened and the open ends are communicated with each other. In addition, the front ends of the unit yarns (110) may be directed in the same direction as the first axis (B1-B1').

Electrons are emitted from the front ends of the unit yarns (110) in the first tube (100a) thus prepared.

The first tube (100a) may be a composite structure of carbon nanotubes formed by arranging a plurality of carbon nanotubes (3) in a predetermined form in a state of aggregation (unit yarn). The emitter may be the first tube (100a) itself as described above.

The emitter of the present invention can easily emit electrons intensively within a unit area from the front ends of the carbon nanotubes (3) constituting the first tube (100a) and from those of the unit yarns (110) in which the carbon nanotubes are aggregated. In particular, the emitter of the present invention can easily emit electrons intensively within a unit area from the carbon nanotubes (3) constituting the respective unit yarns and from the respective unit yarns (110) by virtue of its pipe shape. In addition, the emitter of the present invention is advantageous in maintaining the original shape due to its high self-supportiveness as compared with the carbon nanotube-based emitters in which the carbon nanotubes are independent from each other, without being aggregated, due to the characteristics of the carbon nanotubes that have a very high aspect ratio.

When the electrons intensively emitted in the unit area, for example, from the emitter in an X-ray tube, reach the cathode (for example, a metal target such as beryllium), it is possible to maximize the total amount of X-rays generated in the unit area. Thus, the emitter of the present invention can be a significant measure for solving the problem of miniaturization in the preparation of high-output X-ray tubes.

In contrast, if an emitter is in the form of, for example, a plate-shaped conventional carbon nanotube sheet, the phenomenon would prevail that electrons are emitted from the respective front ends of the sheet in random directions rather than intensively. This may reduce the uniformity of the electron density at which the emitted electrons reach, for example, the cathode, and reduce the density of electrons within a unit area.

For example, the first tube (100a) may be prepared by rolling the carbon nanotube sheet (100) as described with reference to FIG. 4 to surround a wire having a diameter in the unit of micrometers to centimeters as the first axis (B1-B1'), followed by removing the wire, thereby forming a pipe shape that has a first internal space (102) communicating along the first axis (B1-B1').

Although FIG. 9 shows a first tube (100a) in the shape of a pipe having a transverse cross-section of a substantially circular shape, it may have a shape selected from the group consisting of a circle, an ellipse, a semi-circle, and a polygon.

In the first tube (100a), the longest line that passes through the center on the transverse cross-section of the first tube and connects the opposing contours of the cross-section may have a length (L1) of 3 micrometers to 2 centimeters, specifically 100 micrometers to 1 centimeter.

If the length (L1) of the line is less than the above range, the unit yarns (110) interposed with the first internal space (102) are excessively close to each other to thereby interact, the first internal space may be blocked.

In addition, the area where electrons are distributed immediately upon the emission from the emitter substantially corresponds to the cross-sectional area of the first tube (100a). It is not advantageous in that the emission range of electrons may be very limited if the length (L1) of the line is less than the above range, whereby the cross-sectional area of the first tube (100a) is thus narrowed.

If the length (L1) of the line exceeds the above range, the volume occupied by the first internal space is increased, which is undesirable from the structural viewpoint since the shape of the first tube (100a) may be folded or bent. It is particularly undesirable from the viewpoint of efficiency since the concentrated emission of electrons as described above may not be substantially achieved.

The first tube (100a) have a rolled structure in which no overlapping portion exists from the rolling starting point to the rolling ending point. In such event, the rolling starting point and the rolling ending point may be the unit yarns (110a and 110b), respectively, and they are contiguous and fixed by the π-π interaction.

On the other hand, the first tube (100b) may have a rolled structure in which an overlapping portion exists from the rolling starting point (110c) to the rolling ending point (110d). The cross-section of the first tube (100b) in this regard is shown in FIG. 10.

The first tube (100b) according to FIG. 10 may also be prepared in substantially the same manner as that of FIG. 9, and it may have a substantially similar structure in terms of the first internal space, the length of the line, the arrangement of unit yarns, and the like. FIG. 10 differs from FIG. 9 in that the sheet is rolled one time about the imaginary first axis (B1-B1') to surround the axis parallel to the first direction in FIG. 9 whereas the sheet is rolled two or more times in FIG. 10.

For reference, it is possible to achieve a multi-layered structure similar to that shown in FIG. 10 if the multi-layered carbon nanotube sheet (200) according to FIG. 6 is rolled one time about the imaginary first axis (B1-B1') to surround the axis parallel to the first direction.

Meanwhile, the emitter according to the present invention may further comprise a conductive wire in addition to the first tube.

A schematic diagram of an emitter according to an example of the present invention in this regard is shown in FIG. 11.

Referring to FIGS. 9 and 11, the emitter (400) may comprise a first tube (100a) and a conductive wire (420) as shown in FIG. 11.

The emitter (400) comprises the conductive wire (420) that occupies at least a part of the first internal space (102) of the first tube (100a), wherein at least a part of the first tube (100a) surrounds and contacts at least a part of the conductive wire (420).

The conductive wire (420) extends in the first direction and comprises a first end (421) of the front end side, a second end (422) of the base end side, and an outer peripheral side (424) that extends in the first direction between the peripheries of the first end (421) and the second end (422). In such event, the length in the first direction between the first end (421) and the second end (422) of the conductive wire (420) may be defined as a first height (H1).

The emitter (400) may be prepared by rolling, for example, the carbon nanotube sheet (100) shown in FIG. 4 as it is in contact with the conductive wire (420).

Specifically, the carbon nanotube sheet (100) may be rolled on the outer peripheral side (424) in the second direction perpendicular to the first direction as it is in contact with at least a part of the outer peripheral side (424) of the conductive wire (420) while the first height (H1) coincides with the first direction in which the unit yarns (110) constituting the carbon nanotube sheet (100) extend.

As a result, the emitter (400) may have a structure in which the conductive wire (420) is inserted into the first internal space (102) as it is in contact with at least a part of the first tube (100a) while the first height (H1) of the conductive wire (420) coincides with the first direction parallel to the first internal space (102) of the first tube (100a).

Here, the first tube (100a) may comprise a first region (160) that overlaps with the conductive wire (420) and a second region (180) that does not overlap with the conductive wire (420) in the first direction. The emitter (400) may emit electrons from the front end (430) in the second region (180) of the first tube (100a).

In addition, the emitter (400) may comprise a second height (H2), which is the length between both ends of the first tube (100a) in the first direction, that is, the length between the front end (430) in the second region (180) and the base end (or distal end) the first region (160), and a third height (H3), which is the length between both ends of the second region (180) in the first direction.

For reference, the length between both ends of the second region (180) may refer to a segment of the second region (180) from the front end (430) in the second region (180) to the position corresponding to the first end (421) since the first region (160) and the second region (180) are defined with respect to the first end (421) of the conductive wire (420).

Here, the emitter (400) according to the present invention may have a ratio of the third height to the second height third height second height) of 0.1 to 0.9, specifically 0.2 to 0.7, more specifically 0.2 to 0.4.

If the emitter (400) has a ratio of the third height to the second height less than the above range, the front end (430) in the second region (180) from which electrons are emitted is excessively close to the conductive wire (420), which may significantly lower the efficiency of electron emission as the electrons emitted from the front end (430) are absorbed by the conductive wire (420).

On the other hand, if the emitter (400) has a ratio of the third height to the second height exceeding the above range, the area of the first region (160) that is supported by the contact with the conductive wire (420) is narrowed, which is undesirable in terms of durability as a deformation such as folding or bending may occur in the second region (180).

The conductive wire (420) may have a region of margin (426) in which the first tube (100a) is not present on at least a part of the outer peripheral side (424) of the conductive wire adjacent to the second end (422).

The margin region (426) may be a segment that is directly or indirectly fixed to the holder or the like in a tube when the emitter (400) is employed in, for example, an x-ray tube, and it may serve as a current-carrying path through which current passes to the first tube (100a).

In the first tube as described above, the thickness between the inner side that forms the first internal space and the outer side exposed to the outside on a transverse cross-section may be 1 micrometer to 2,000 micrometers, specifically 30 micrometers to 300 micrometers, more specifically 30 micrometers to 100 micrometers.

If the thickness is less than the above range, the shape of the pipe may not be maintained well due to the lower rigidity of the carbon nanotube sheet. If the thickness exceeds the above range, it is not preferable from the economical viewpoint since the effectiveness of manufacturing cost is low.

<Second Tube>

The emitter according to the present invention may comprise a second tube in which a plurality of the first tubes are arranged to form a pipe shape.

An example on the above is schematically shown in FIGS. 12 to 15.

Referring to FIG. 12, the second tube (300) comprises a second internal space (302) formed by arranging a plurality of the first tubes (310) about an imaginary second axis (B2-B2') parallel to the first direction.

Specifically, the second tube (300) may be composed of a structure in which the arrangement (for example, 300a in FIG. 13) of the first tubes (310) located side by side is repeated to surround the imaginary second axis (B2-B2') parallel to the first direction in a state in which the sides of one first tube (310) of the plurality of first tubes (310) are contiguous with the sides of its neighboring first tubes (310). For reference, the side of the first tube (310) may refer to any part of the side that extends between both ends of the first tube (310).

In such event, the second internal space (302) has a structure in which both ends in the first direction are opened, the open ends are communicated with each other, and the respective front ends of the first tubes (310) are oriented in the same direction as the axis.

The second tube (300) may be prepared using an assembly (300a) in which a plurality of the first tubes (310) are arranged in a predetermined shape, for example, as shown in FIG. 13.

Referring to FIGS. 13 to 15, the assembly (300a) comprises a plurality of the first tubes (310) in the shape of a pipe.

The first tube (310) may be composed of a structure in which the arrangement of the plurality of unit yarns (312) located side by side is repeated to surround the imaginary third axis (B3-B3') parallel to the first direction in a state in which the sides of one unit yarn (312) of the plurality of unit yarns (312) are contiguous with the sides of its neighboring unit yarns (312).

For example, the first tube (310) may be prepared by rolling any carbon nanotube sheet similar to the carbon nanotube sheet (100) as described with reference to FIG. 4 or 6 and having a smaller thickness and width to surround a wire having a diameter in the unit of micrometers to centimeters as the third axis (B3-B3'), followed by removing the wire, thereby forming a pipe shape that has a first internal space (320) communicating along the third axis (B3-B3').

The transverse cross-section of the first tube (310) may have a shape selected from the group consisting of a circle, an ellipse, a semicircle, and a polygon, and the longest line that passes through the center on the transverse cross-section of the first tube (310) and connects the opposing contours of the cross-section may have a length (L3) of 5 micrometers to 200 micrometers.

If the length (L3) of the line is less than the above range, the unit yarns interposed with the first internal space (320) are excessively close to each other to thereby interact, whereby the first internal space (320) may be blocked.

On the other hand, if the length (L3) of the line exceeds the above range, the volume occupied by the first internal space is increased, which is undesirable from the structural viewpoint since the shape of the second tube (300) may be folded or bent. It is particularly undesirable from the viewpoint of efficiency since the concentrated emission of electrons as described above may not be substantially achieved.

In the first tube (310), the unit yearns (312) are contiguous and fixed by the π-π interaction, and the unit yarns (312) at the rolling starting point and the ending point are fixed by the π-π interaction.

The unit yarn (312) has a fiber form in which one carbon nanotube is grown long. Alternatively, the unit yarn (312) has a fiber form in which the sides of a plurality of carbon nanotubes (3) are aggregated by the π-π interaction substantially in a long cylindrical shape (a cylindrical shape with a filled central portion or a cylindrical shape with a void central portion). The carbon nanotubes (3) and the unit yarn (312) composed thereof may be aligned in the same direction.

The assembly (300a) shown in FIG. 13 has a structure that comprises a plurality of the first tubes (310) having the structure described above. Specifically, the assembly may have an arrangement structure in which the arrangement of the plurality of unit tubes (310) located side by side is repeated in the second direction perpendicular to the first direction in a state in which the sides of one first tube (310) of the plurality of unit tubes (310) are contiguous with the sides of its neighboring first tubes (310). In such event, the first tubes (310) may be fixed by the π-π interaction.

In some cases, a conductive adhesive such as a carbon nanotube paste, a silver paste, and/or a solvent capable of enhancing the π-π interaction may be applied between the contiguous first tubes (310) to directly adhere the contiguous first tubes (310) or to enhance the π-π interaction.

The solvent may be an at least one organic solvent selected from the group consisting of ethane, ethylene, ethanol, methane, methanol, propane, propene, propanol, acetone, xylene, carbon monoxide, chloroform, acetylene, ethyl acetic acid, diethyl ether, polyethylene glycol, ethyl formate, mesitylene(1,3,5-trimethylbenzen), tetrahydrofuran, dimethylformamide, carbon tetrachloride, naphthalene, anthracene, dichloromethane, ketone, ether, hexane, heptane, octane, pentane, pentene, hexene, benzene, and toluene, but it is not limited thereto.

As described above, the second tube (300) may comprise the second internal space (302) formed by arranging the first tubes (310) and the first internal space (320) formed by arranging the unit yarns (312) of the first tube (310). The respective front ends of the carbon nanotubes (3), the unit yarns (312), the first tubes (310), and the second tube (300) are oriented in the same direction as the second axis (B2-B2').

Electrons may be emitted from all of the respective front ends. In one example according to the present invention, the emitter may be the second tube (300) itself. The second tube (300) may be a composite structure of carbon nanotubes formed by arranging a plurality of the first tubes in a predetermined form, wherein the first tube is formed by arranging a plurality of carbon nanotubes (3) aggregated in a predetermined form (i.e., unit yarn).

The emitter composed of the second tube (300) has a composite structure in which the electron emission path includes the carbon nanotubes (3), the unit yarns (312) in which the carbon nanotubes are aggregated, and the first tubes (310) composed of the unit yarns. The electrons emitted from each of them can more reliably maintain uniformity in a unit area.

When the electrons intensively emitted in the unit area, for example, from the emitter in an X-ray tube, reach the cathode, it is possible to maximize the total amount of X-rays generated in the unit area. The emitter of the present invention can be a significant measure for solving the problem of miniaturization in the preparation of high-output X-ray tubes.

This is a major advantage that the emitter of the present invention shows very good efficiency of electron emission even under a relatively lower electric field. In addition, the emitter based on the multiple pipe shape can maximize the effects described above by the combination of (i) the effect of concentrated emission of electrons in different unit yarns constituting a unit tube; and (ii) the effect of concentrated emission of electrons in different unit tubes.

In contrast, if an emitter is merely in the form of, for example, a plate-shaped conventional carbon nanotube sheet, the phenomenon would prevail that electrons are emitted from the respective front ends of the sheet in random directions rather than intensively. This may reduce the total amount of electrons that reach and collide with, for example, the cathode.

For example, the second tube (300) may be prepared by rolling the assembly (300a) as described with reference to FIG. 13 to surround a wire having a diameter in the unit of micrometers to centimeters as the axis (B2-B2'), followed by removing the wire, thereby forming a multi-layered pipe shape that has a second internal space (302) communicating along the axis (B2-B2') and the first internal space (320) of the first tube (10).

The transverse cross-section of the second tube (300) may have a shape selected from the group consisting of a circle, an ellipse, a semicircle, and a polygon, and the longest line that passes through the center on the transverse cross-section of the first tube (300) and connects the opposing contours of the cross-section may have a length (L2 in FIG. 12) of 100 micrometers to 2 centimeters.

If the length (L2) of the line is less than the above range, the first tubes (310) interposed with the second internal space (302) are excessively close to each other to thereby interact, whereby the second internal space (302) may be blocked.

In addition, the area where electrons are distributed immediately upon the emission from the emitter substantially corresponds to the cross-sectional area of the second tube (300). It is not advantageous in that the emission range of electrons may be very limited if the length (L2) of the line is less than the above range and the cross-sectional area of the second tube (300) is thus narrowed.

If the length (L2) of the lire exceeds the above range, the volume occupied by the second internal space (302) is increased, which is undesirable from the structural viewpoint since the shape of the second tube (300) may be folded or bent. It is particularly undesirable from the viewpoint of efficiency since the concentrated emission of electrons as described above may not be substantially achieved.

In the second tube (300) shown in FIG. 12, the first tubes (310) are arranged in a structure in which there exists no overlapping portion of the first tubes, the first tubes (S and F) at the arrangement starting point and the arrangement ending point are contiguous, and the contiguous first tubes (S and F) are fixed by the π-π interaction. But a second tube with an overlapping portion is also possible.

Specifically, the first tubes are arranged about a second axis (B2-B2') in the second tube (300') shown in FIG. 16 such that the first tube (F') at the arrangement ending point is contiguous with another first tube (F') spaced apart from the first tube (S') at the arrangement starting point, and an overlapping portion may exist between the first tube (S') at the arrangement starting point and the first tube (F') at the arrangement ending point.

In such event, the first tubes in the overlapping portion may be fixed the π-π interaction.

Meanwhile, the emitter according to the present invention may further comprise a conductive wire in addition to the second tube. A schematic diagram in this regard is shown in FIG. 17.

Referring to FIGS. 12 to 15 and 17, the emitter (500) comprises the second tube (300) shown in FIG. 12 and the conductive wire shown in FIG. 17.

The emitter (500) comprises the conductive wire (520) that occupies at least a part of the second internal space (302) of the second tube (300), and at least a part of the second tube (300) surrounds and contacts at least a part of the conductive wire (520).

The conductive wire (520) extends in the first direction and comprise a first end (521) of the front end side, a second end (522) of the base end side, and an outer peripheral side (524) that extends in the first direction between the peripheries of the first end (521) and the second end (522), wherein the length in the first direction between the first end (521) and the second end (522) of the conductive wire (520) may be defined as a first height (H1).

The emitter (500) may have a structure in which the conductive wire (520) is inserted into the second internal space (302) as it is in contact with at least a part of the second tube (300) while the first height (H1) of the conductive wire (520) coincides with the first direction along which the second internal space (302) of the second tube (300) communicates.

Here, the second tube (300) may comprise a first region (360) that overlaps with the conductive wire (520) and a second region (380) that does not overlap with the conductive wire (520) in the first direction. The emitter (500) may emit electrons from the front end (530) in the second region (380).

In addition, the emitter (500) may comprise a second height (H2), which is the length between both ends of the second tube (300) in the first direction, that is, the length between the front end (530) in the second region (380) and the base end (or distal end) in the first region (360), and a third height (H3), which is the length between both ends of the second region (380) in the first direction.

For reference, the length between both ends of the second region (380) may refer to a segment of the second region (380) from the front end (530) in the second region (380) to the position corresponding to the first end (521) since the first region (360) and the second region (380) are defined with respect to the first end (521) of the conductive wire (520).

Here, the emitter (500) according to the present invention may have a ratio of the third height to the second height (=third height/second height) of 0.1 to 0.9, specifically 0.2 to 0.7, more specifically 0.2 to 0.4.

If the emitter (500) has a ratio of the third height to the second height less than the above range, the front end (530) in the second region (380) from which electrons are emitted is excessively close to the conductive wire (520), which may significantly lower the efficiency of electron emission as the electrons emitted from the front end (530) are absorbed by the conductive wire (520).

On the other hand, if the emitter (500) has a ratio of the third height to the second height exceeding the above range, the area of the first region (360) that is supported by the contact with the conductive wire (520) is narrowed, which is undesirable in terms of durability as a deformation such as folding or bending may occur m the second region (380).

The conductive wire (520) may have a region of margin (526) in which the second tube (300) is not present on at least a part of the outer peripheral side (524) of the conductive wire adjacent to the second end (522).

The margin region (526) may be a part that is directly or indirectly fixed to the holder or the like in a tube when the emitter (500) is employed in, for example, an x-ray tube, and it may serve as a current-carrying path through which current passes to the second tube (300).

Although the present invention has been fully described by way of example, it is to be understood that the invention is intended to cover various modifications and equivalent arrangements included within the spirit and scope of the invention.

The invention claimed is:

1. An emitter, which comprises a first tube composed of a carbon nanotube sheet that comprises a plurality of unit yarns having a structure in which a plurality of carbon nanotubes are aggregated and extend in a first direction,
   wherein the first tube is in the form of a pipe having a first internal space in which the carbon nanotube sheet is rolled about an imaginary first axis parallel to the first direction,
   wherein the respective front ends of the unit yarns are oriented in the same direction as the axis,
   wherein in the first tube, the carbon nanotube sheet is rolled such that an overlapping portion exists from a rolling starting point to a rolling ending point, and
   wherein the unit yarns in the overlapping portion are fixed by π-π interaction while they are contiguous to each other.

2. The emitter of claim 1, wherein in the first tube, thickness between inner side that forms the first internal space and outer side exposed to the outside on a transverse cross-section is 1 micrometer to 2,000 micrometers.

3. The emitter of claim 1, wherein transverse cross-section of the first tube has a shape selected from the group consisting of a circle, an ellipse, a semicircle, and a polygon, and
wherein longest line that passes through the imaginary first axis on the transverse cross-section of an first tube and connects the opposing contours of the cross-section has a length of 3 micrometers to 2 centimeters.

4. The emitter of claim 1, wherein the first internal space has a structure in which both ends of the first internal space in the first direction are opened and the open ends are communicated with each other.

5. The emitter of claim 1, wherein the carbon nanotube sheet comprises an arrangement structure in which the arrangement of the unit yarns located side by side is repeated in a second direction perpendicular to the first direction in a state in which sides of one unit yarn of the plurality of unit yarns are contiguous with sides of its neighboring unit yarns.

6. An emitter, comprising:
a first tube composed of a carbon nanotube sheet that comprises a plurality of unit yarns having a structure in which a plurality of carbon nanotubes are aggregated and extend in a first direction,
wherein the first tube is in the form of a pipe having a first internal space in which the carbon nanotube sheet is rolled about an imaginary first axis parallel to the first direction, and
respective front ends of the unit yarns are oriented in the same direction as the axis, which comprises a second tube in which a plurality of the first tubes are arranged to form a pipe shape,
wherein the second tube comprises a second internal space formed by arranging the plurality of first tubes about an imaginary second axis parallel to the first direction, the second internal space has a structure in which both ends of the first internal space in the first direction are opened and the open ends are communicated with each other, and
wherein the respective front ends of the first tubes are oriented in the same direction as the axis.

7. The emitter of claim 6, wherein the second tube is composed of a structure in which the arrangement of the first tubes located side by side is repeated to surround the imaginary second axis parallel to the first direction in a state in which sides of one first tube of the plurality of first tubes are contiguous with sides of its neighboring first tubes.

8. The emitter of claim 7, wherein in the second tube, the first tubes are arranged such that there exists no overlapping portion, the first tubes at an arrangement starting point and at an arrangement ending point are contiguous to each other, and the contiguous first tubes are fixed by π-π interaction.

9. The emitter of claim 7, wherein in the second tube, the first tube at an arrangement ending point is contiguous to the other first tube spaced apart from the first tube at an arrangement starting point, an overlapping portion exists between the first tube at the arrangement starting point and the first tube at the arrangement ending point, and
wherein the first tubes in the overlapping portion are fixed by π-π interaction.

10. The emitter of claim 6, wherein in the second tube, thickness between an inner side that forms the second internal space and an outer side exposed to the outside on a transverse cross-section is 5 micrometers to 5,000 micrometers.

11. The emitter of claim 6, wherein a transverse cross-section of the second tube has a shape selected from the group consisting of a circle, an ellipse, a semicircle, and a polygon, longest line that passes through the center on the transverse cross-section of the second tube and connects an opposing contours of the cross-section have a length of 100 micrometers to 2 centimeters, and
wherein the transverse cross-section of the first tube has a shape selected from the group consisting of a circle, an ellipse, a semicircle, and a polygon, and the longest line that passes through the center on the transverse cross-section of the first tube and connects the opposing contours of the cross-section have a length of 5 micrometers to 200 micrometers.

12. The emitter of claim 6, which further comprises a conductive wire that occupies at least a part of the second internal space, wherein at least a part of the second tube surrounds and contacts at least a part of the conductive wire.

13. The emitter of claim 12, wherein the conductive wire extends in the first direction and comprises a first end of the front end side, a second end of the base end side, and an outer peripheral side that extends in the first direction between the peripheries of the first end and the second end,
wherein the length in the first direction between the first end and the second end of the conductive wire is defined as a first height, and
wherein the conductive wire is inserted into the first internal space as it is in contact with at least a part of the first tube while the first height coincides with the first direction.

14. The emitter of claim 13, wherein the second tube comprises a first region that overlaps with the conductive wire and a second region that does not overlap with the conductive wire in the first direction; and
wherein the emitter emits electrons from the front end in the second region.

15. The emitter of claim 14, which comprises a second height that is the length between both ends of the second tube in the first direction, and a third height that is the length between both ends of the second region in the first direction,
wherein the ratio of the third height to the second height (=third height/second height) is 0.1 to 0.9.

16. The emitter of claim 13, wherein the conductive wire has a region of margin in which the first tube is not present on at least a part of the outer peripheral side adjacent to the second end.

17. The emitter of claim 12, wherein a transverse cross-section of the conductive wire has a shape selected from the group consisting of a circle, an ellipse, a semicircle, and a polygon, and
wherein a longest line that passes through the imaginary first axis on the transverse cross-section of the first tube and connects opposing contours of the cross-section has a length of 3 micrometers to 2 centimeters.

18. The emitter of claim 12, wherein the conductive wire is composed of one metal selected from the group consisting of tungsten, copper, nickel, stainless steel, and molybdenum, or an alloy of two or more thereof.

* * * * *